US006681877B2

(12) United States Patent
Ono et al.

(10) Patent No.: US 6,681,877 B2
(45) Date of Patent: Jan. 27, 2004

(54) WORKING VEHICLE

(75) Inventors: Hiroyuki Ono, Tokyo (JP); Yasuhiko Miyamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,164

(22) Filed: Sep. 17, 2001

(65) Prior Publication Data

US 2002/0033289 A1 Mar. 21, 2002

(30) Foreign Application Priority Data

Sep. 18, 2000 (JP) ........................................ 2000-282711
Sep. 13, 2001 (JP) ........................................ 2001-278099

(51) Int. Cl.[7] .............................................. B60K 31/18
(52) U.S. Cl. ........................ 180/171; 180/173; 180/174; 701/93; 123/351
(58) Field of Search ................................ 180/171, 173, 180/174, 333, 338; 701/93, 96; 361/51; 123/350, 351, 352, 349, 378

(56) References Cited

U.S. PATENT DOCUMENTS

| 4,462,479 | A | * | 7/1984 | Steel ............................ 123/351 |
| 4,797,826 | A | * | 1/1989 | Onogi et al. ................. 123/351 |
| 4,966,247 | A | * | 10/1990 | Masuda ........................ 180/170 |
| 5,161,634 | A | * | 11/1992 | Ichihara et al. .............. 180/179 |
| 5,335,487 | A | * | 8/1994 | Murakawa et al. .......... 56/10.5 |
| 5,429,089 | A | * | 7/1995 | Thornberg et al. .......... 123/352 |
| 5,450,828 | A | * | 9/1995 | Sakamoto et al. ..... 123/339.11 |
| 5,549,089 | A | * | 8/1996 | Snell et al. .................. 123/352 |
| 5,652,486 | A | * | 7/1997 | Mueller et al. .............. 180/171 |
| 5,676,217 | A | * | 10/1997 | Torii et al. ................... 180/171 |
| 5,749,063 | A | * | 5/1998 | Sakonjyu et al. ........... 123/350 |
| 5,757,161 | A | * | 5/1998 | Ikkai et al. .................. 180/171 |
| 6,016,458 | A | * | 1/2000 | Robinson et al. ........... 235/492 |
| 6,052,644 | A | | 4/2000 | Murakami et al. |
| 6,112,719 | A | * | 9/2000 | Earleson ...................... 123/352 |
| 6,128,570 | A | * | 10/2000 | Akhteruzzaman ........... 123/352 |
| 6,192,860 | B1 | * | 2/2001 | Hatlen ......................... 123/352 |
| 6,220,379 | B1 | * | 4/2001 | Schugt et al. ............... 180/65.1 |
| 6,223,118 | B1 | * | 4/2001 | Kobayashi et al. ........... 701/54 |
| 6,246,948 | B1 | * | 6/2001 | Thakker ....................... 123/351 |
| 6,359,403 | B1 | * | 3/2002 | Pollklas et al. .............. 318/432 |

FOREIGN PATENT DOCUMENTS

| DE | 80 16 637 6 | 6/1981 |
| DE | 91 06 579.8 | 12/1991 |
| DE | 43 06 532 A1 | 9/1994 |

\* cited by examiner

Primary Examiner—Brian L. Johnson
Assistant Examiner—Kelly E Campbell
(74) Attorney, Agent, or Firm—McGinn & Gibb, PLLC

(57) ABSTRACT

A working vehicle is provided for improving safety and work efficiency by changing a travel speed limit appropriately depending on forms and conditions of work. The working vehicle is driven with an engine, and a working machine such as a working pump is mounted on the vehicle. Fuel supplied to the engine is regulated by an injector. Travel speeds of the working vehicle are detected with a vehicle speed sensor. A control unit is provided with a high speed travel mode which limits vehicle speed at or below a predetermined high speed limit and a low speed travel mode which limits vehicle speed at or below a low speed limit which is set below the high speed limit. In this way, either the high speed travel mode or the low speed travel mode is set according to a changeover signal from a travel mode changeover switch.

15 Claims, 10 Drawing Sheets

WORKING VEHICLE

BACKGROUND OF THE INVENTION

The present invention relates to a working vehicle suitable for a turf grass management working vehicle used for work such as fertilizing, chemical spraying, lawn mowing and the like in golf courses.

In the golf courses and parks, the working vehicle, also called turf grass management working vehicles, are used to grow turf grass. With such vehicles, various types of works such as the fertilizing, spreading topdressing, the spraying chemicals, aerating soil by injecting air, or clearing tree leaves by using a blower are conducted. The various types of works are carried out with an attachment, appropriate for the types of works, mounted on the bed of the working vehicle.

For such working vehicles, maximum travel speeds may be limited by laws and regulations such as restrictions on off-road vehicles in the U.S. With respect to the U.S. restriction, the maximum travel speed of the vehicles is limited to about 38.6 km/h (or 24 mile/h). The restrictions are also applied to the vehicles for the work in the golf course. Consequently, in a conventional working vehicle, a speed limiting device using an electronic control unit for controlling the engine is provided to limit the vehicle speed so that the vehicle does not exceed the legal speed limit.

In this speed limiting device, the vehicle speed is detected with a vehicle speed sensor which detects the number of revolutions of a wheel, and the detected speed is inputted to an electronic control unit (ECU). In the electronic control unit, an upper limit value of the vehicle speed is preset, and when the vehicle speed reaches the upper limit value, the engine speed is controlled so that the engine speed does not increase any more. Thereby, the engine speed is limited and controlled so that the vehicle speed does not exceed a predetermined one.

On the other hand, an operator of the working vehicle is not always a skilled person. In such a case, the vehicle speed is preferably limited to a lower speed than the maximum speed in accordance with the laws and regulations. Also, when a heavy object, such as a container of chemical spraying machine, is mounted on the vehicle, higher safety is achieved with a lower speed limit which is independent of the skill of the operator.

Contrary to this, with the conventional vehicle speed limiting device described above, although the device can limit a maximum speed in accordance with a legal speed limit, changing the speed limit with respect to the operator's skill or the weight of an object mounted on the vehicle is not taken into account. Therefore, the restrictions are required in that, when the vehicle is operated by a beginner, the person must be accompanied by a skilled operator about the vehicle. Also, the restrictions are required with respect to a limit in the amount of a load which is to be mounted on the vehicle. These restrictions have all caused problems in terms of work efficiency.

SUMMARY OF THE INVENTION

An object of the present invention is to provide a working vehicle with which a travel speed limit can be appropriately changed according to a working environment, so that safety and work efficiency can be improved when operating the working vehicle.

The working vehicle according to the present invention is driven by an engine and traveled with a working machine mounted thereon. The working vehicle comprises a vehicle speed sensor for detecting a travel speed of the working vehicle, travel mode changeover means for setting any one of a plurality of travel modes with different predetermined speed limits, and control means for controlling the working vehicle in such a manner that the travel speed of the working vehicle detected by the vehicle speed sensor does not exceed a predetermined speed limit of the travel mode set by the travel mode changeover means.

According to the present invention, because a plurality of vehicle speed limits are provided which can be selected as required, a speed limit can be appropriately changed depending on the operator's skill and/or the working conditions such as the weight of an object mounted on the vehicle, the weather, and the like. Consequently, a person other than an experienced operator can also safely operate the working vehicle, thereby safety at work can be secured.

Also, in the working vehicle of the present invention, the travel mode setting means may have, for example, two travel speed modes, a high speed travel mode and a low speed travel mode. The high speed travel mode limits the travel speed of the working vehicle at or below a predetermined first speed limit, and the low speed travel mode limits the travel speed at or below a second speed limit which is set at a speed lower than that of the first speed limit. Thereby, each travel speed of the high speed travel mode and the low speed travel mode can be kept at or below each predetermined speed limit thereof, so that the safety at work can be secured.

Furthermore, a switch which is operated by the operator may be provided as the travel mode changeover means, and the operator can select an appropriate travel mode with the switch. Additionally, a switch which is operated by a vehicle supervisor and which cannot be operated by the operator while traveling may be provided. With this switch operational, mistakes by the operator can be prevented and safety can be improved.

Additionally, in the working vehicle of the present invention, weight detecting means for detecting the weight of a working machine mounted on the working vehicle may be further provided and be so arranged that the travel mode changeover means automatically changes the travel mode according to the weight detected by the weight detecting means. Thereby, the travel mode is automatically changed over to the low speed travel mode independently of the operator's skill when the weight of an object mounted on the vehicle is heavy. In this way, operational mistakes by the operator can be eliminated and safety can be improved.

BRIEF DESCRIPTION OF THE DRAWINGS

These and other objects and advantages of the present invention will become understood from the following description with reference to the accompanying drawings, wherein.

DETAILED DESCRIPTION OF THE PREFERRED EMBODIMENTS

Figure 1:
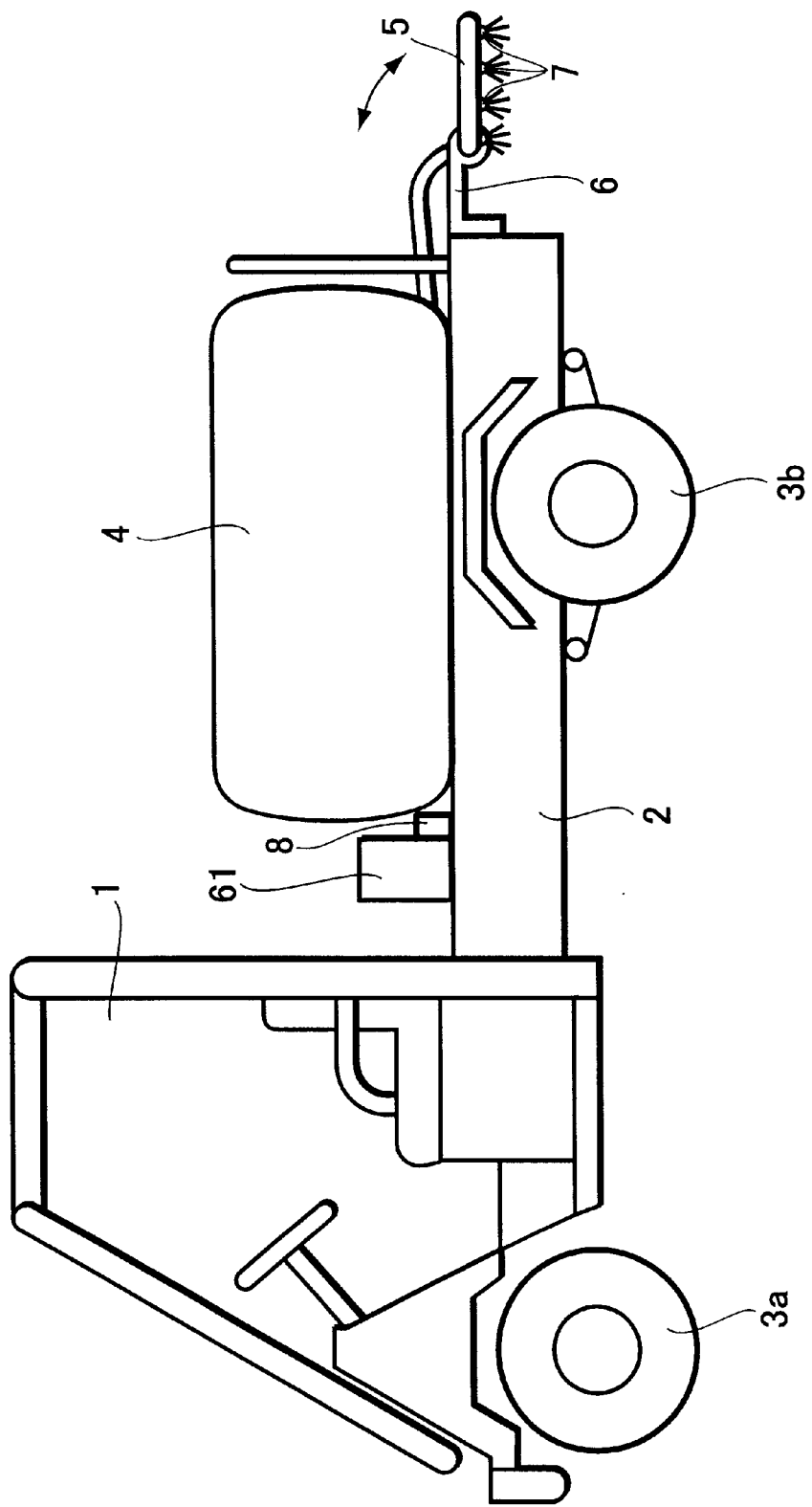
FIG. 1 is a side view showing a working vehicle of a first embodiment of the present invention.

The detail of the preferred embodiments of the present invention will be described below referring to the drawings.

Embodiment 1

Figure 2:
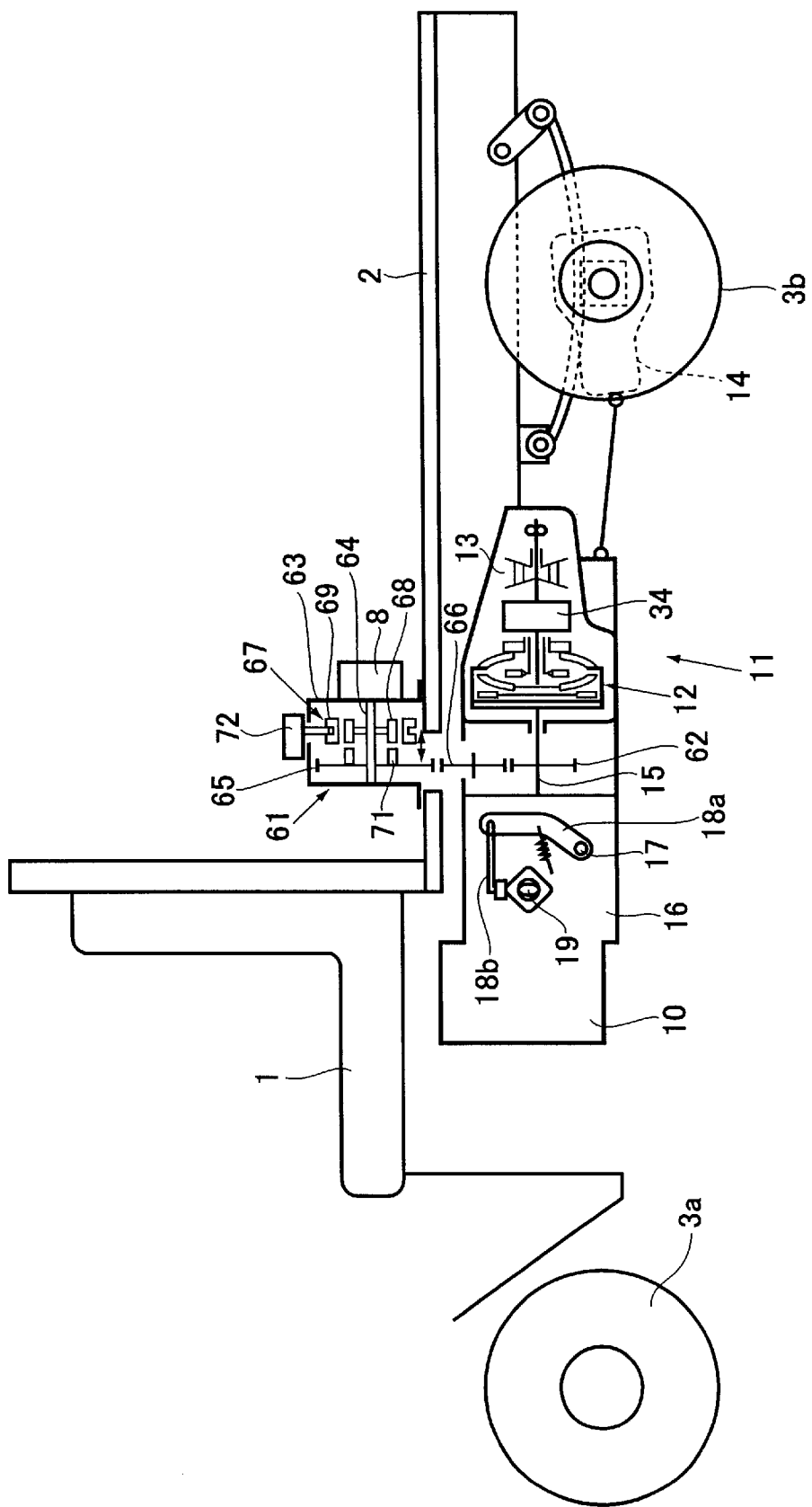
FIG. 2 is an enlarged side view showing a power transmitting flow of the working vehicle in FIG. 1.
Figure 3:
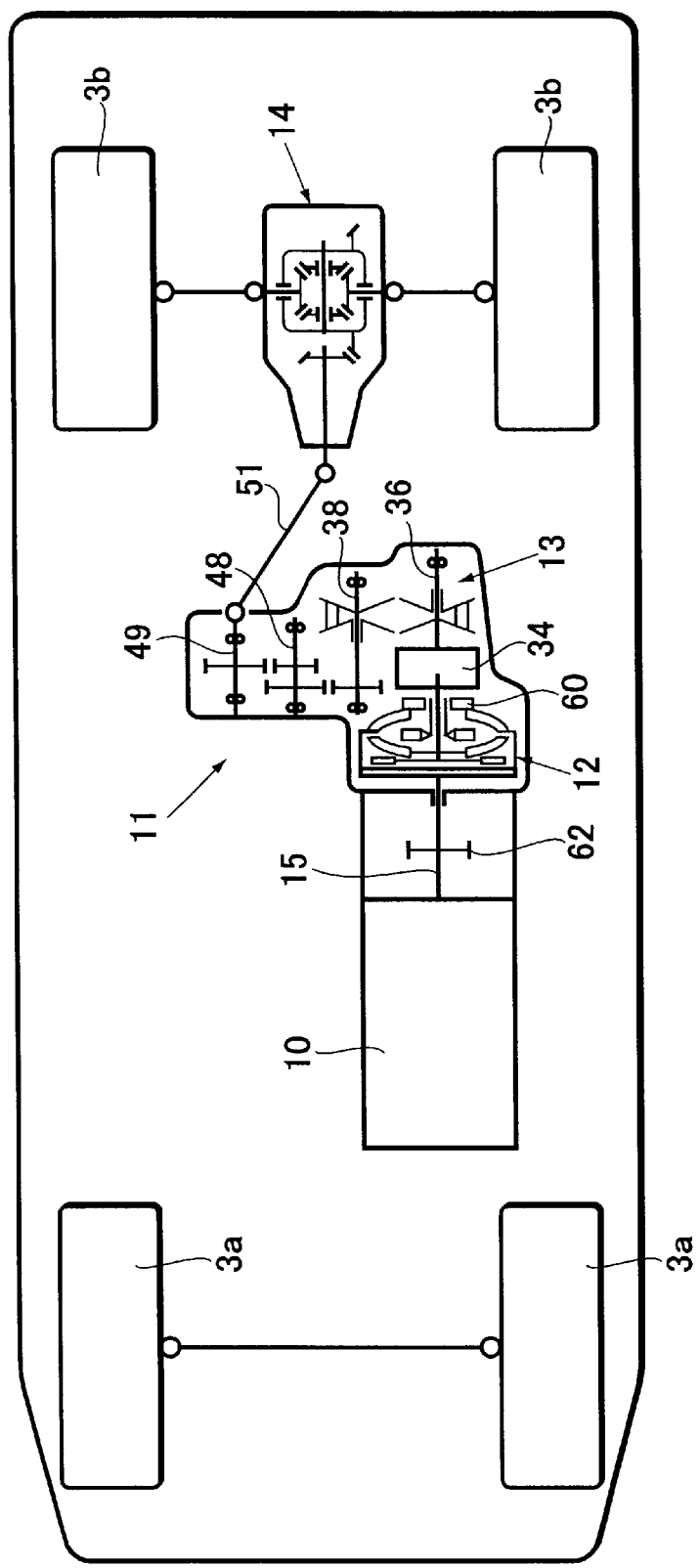
FIG. 3 is a plan view showing the power transmitting flow of the working vehicle in FIG. 1.

FIG. 1 is a side view of a working vehicle of a first embodiment of the present invention, FIG. 2 is an enlarged side view showing a power transmitting flow of the working vehicle in FIG. 1, and FIG. 3 is a plan view showing the power transmitting flow in FIG. 2.

This working vehicle is provided with an operator's seat 1 in a front part and a bed 2 in a rear part, and a pair of front wheels 3a and a pair of rear wheels 3b are provided. It is so arranged that any of a plurality of attachments can be detachably mounted on the bed 2 depending on the kind of work, and FIG. 1 shows a state in which a chemical tank 4 is mounted on the bed 2 for spraying chemicals (liquid chemical) over turf grass of a golf course.

A spray pipe 5 is fitted to the bed 2 by a holder 6. The spray pipe 5 is rotatable, with respect to the holder 6, as indicated by the arrows, and the spray pipe can either be positioned horizontally, as shown, or in a folded state. A plurality of spray nozzles 7 are provided on the spray pipe 5, and chemical substances in the chemical tank 4 are sprayed from the spray nozzles 7 by a supply pump, or a work pump 8.

When spraying grainy fertilizer over the turf grass of the golf course by using the working vehicle, a scraper with a hopper filled with fertilizer is fitted to the bed 2, and when spreading soil and sand or topdressing, the soil and sand or the topdressing is put into the hopper. When fertilizer or soil and sand in the hopper is to be spread by the scraper, a hydraulic pump is installed as the work pump 8, and a spreading device provided on the scraper is driven by a hydraulic motor with hydraulic oil discharged from the hydraulic pump.

When working at a high position by using the working vehicle, a lifter driven by the hydraulic motor is fitted on the bed 2, and when pumping air into the soil to activate turf grass, aerating nozzles for discharging compressed air supplied from an air pump are fitted on the bed 2. Furthermore, when smoothing off the soil and sand spread over the ground, a rake which is oscillated by a hydraulic motor is fitted on the bed 2.

As shown in FIG. 2 and FIG. 3, for driving the working vehicle, a power from an engine 10 is transmitted to the drive wheels through a power transmitting mechanism 11. The power transmitting mechanism 11 has a torque converter 12, an automatic transmission 13, and a differential device 14.

As shown in FIG. 3, because the working vehicle has the rear wheels 3b as drive wheels, the differential device 14 is provided for the rear wheels. However, the front wheels 3a or both the front and rear wheels 3a, 3b can be the drive wheels. Both the front wheels 3a and the rear wheels 3b are for a working vehicle designed for an off-road use which can travel on the turf grass. The aforementioned wheels have a wider width than that of ordinary wheels.

Figure 4:
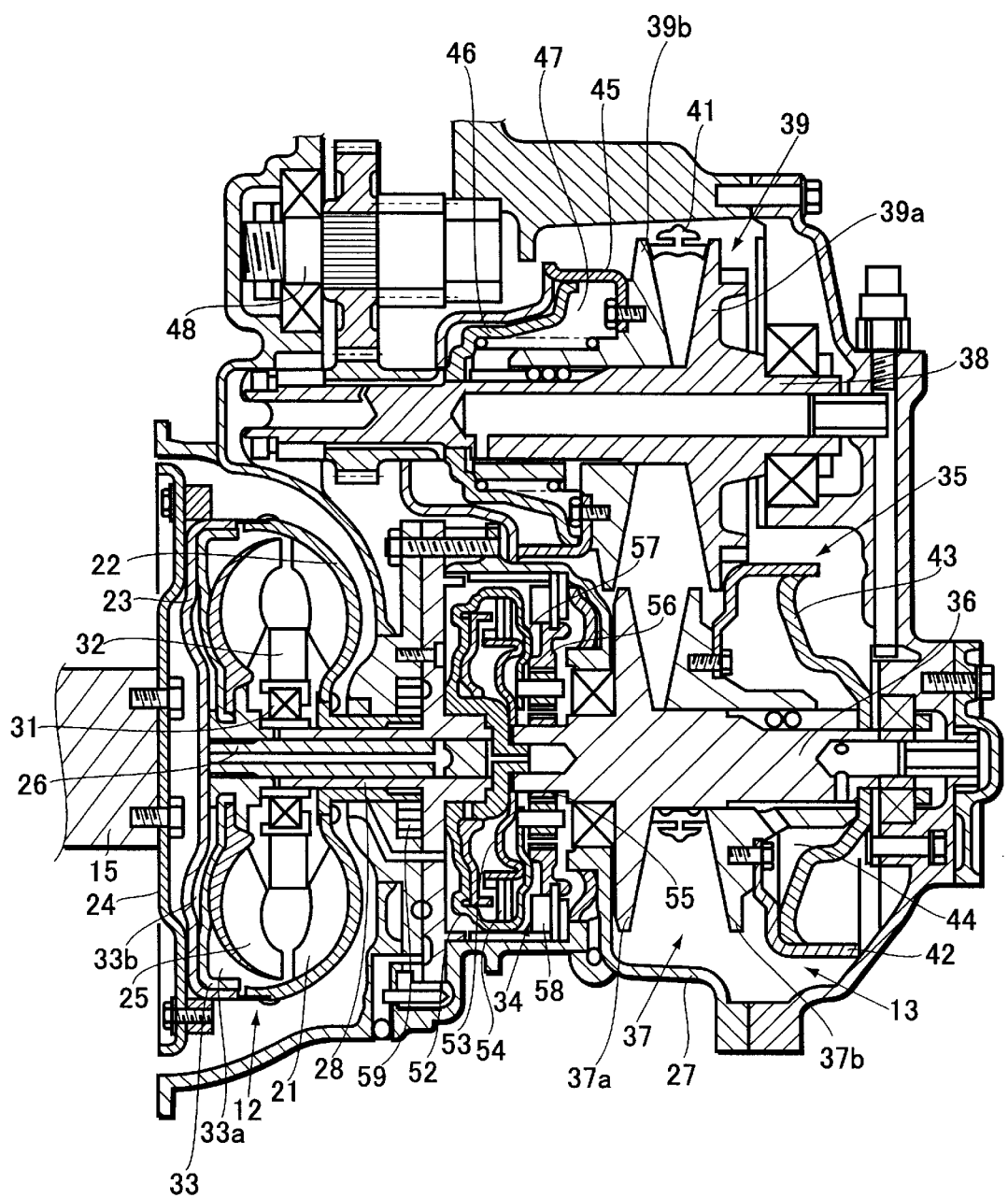
FIG. 4 is an enlarged cross sectional view showing a torque converter and an automatic sifting device.

FIG. 4 is an enlarged sectional view showing the torque converter 12 and the automatic transmission 13. The torque converter 12 is connected to a crankshaft 15 of the engine 10. The torque converter 12 has a pump-side case 22 provided with a pump impeller 21 and a front cover 23 fixed to the pump-side case 22. The front cover 23 is fixed to the crankshaft 15 through a drive plate 24. A turbine runner 25, arranged facing the pump impeller 21, is fixed to a turbine shaft 26, and the turbine shaft 26 is rotatably putted in a hollow supporting shaft 28 fixed to a transmission case 27. A stator 32 is mounted on the supporting shaft 28 through a one-way clutch 31.

A lock-up clutch 33 is fitted to the turbine shaft 26 and connected to the front cover 23. On one side of the lock-up clutch 33 is an oil applying chamber 33a and on the other side thereof is a oil releasing chamber 33b. Therefore, the torque converter 12 is operated by a circulation of the hydraulic oil supplied to the oil releasing chamber 33b through the oil applying chamber 33a, and the torque converter 12 becomes a lock-up state when the pressure in the oil releasing chamber 33b is lowered by supplying the hydraulic oil to the oil applying chamber 33a and thereby the lock-up clutch 33 is connected to the front cover 23. Thus the power of the crankshaft 15 is transmitted to the turbine shaft 26 through the torque converter 12 or the lock-up clutch 33.

The automatic transmission 13 is a continuously variable transmission, in which the rotation of the turbine shaft 26 is transmitted to a primary shaft 36 of the continuously variable transmission 35 through a forward-reverse changeover device 34. The primary shaft 36 is provided with a primary pulley 37, which has a fixed pulley 37a integrally formed with the primary shaft 36, and a movable pulley 37b mounted on the primary shaft 36 in such a way that it can axially slide through a ball spline. The movable pulley 37b is positioned for facing the fixed pulley 37a. The width of the groove between the pulleys is variable. A secondary shaft 38 arranged parallel to the primary shaft 36 is provided with a secondary pulley 39, which has a fixed pulley 39a integrally formed with the secondary shaft 38 and a movable pulley 39b mounted, in the same way as the movable pulley 37b, on the secondary shaft 38 facing the fixed pulley 39a so that it can axially slide. The width of the groove between the pulleys is variable as well as that of the primary shaft 36.

A belt 41 is arranged between the primary pulley 37 and the secondary pulley 39. The belt 41 is formed with a large number of steel pieces securely held by steel bands. The number of revolutions of the secondary shaft 38 can be varied, without steps, by making the radii of the belt 41 on the pulleys 37 and 39 vary through the variation of the groove widths of both the pulleys 37 and 39. In FIG. 4, both narrowed and widened states of each of the pulleys 37 and 39 are shown.

A primary oil chamber 44 is formed with a cylinder 42 fixed to the movable pulley 37b and a plunger 43 fixed to the primary shaft 36. A secondary oil chamber 47 is formed with a cylinder 45 fixed to the movable pulley 39b and a plunger 46 fixed to the secondary shaft 38. Each pulley-groove width is varied by adjusting hydraulic pressure supplied to each of the oil chambers 44 and 47.

As shown in FIG. 3, the secondary shaft 38 is connected to a first and second intermediate shafts 48 and 49 through gears. The intermediate shaft 49 is connected to the differential device 14 through a connecting shaft 51.

As shown in FIG. 4, the forward-reverse changeover device 34 has a clutch drum 52 fixed to the turbine shaft 26 and a clutch hub 53 fixed to the primary shaft 36. A multi-disk type forward clutch 54 is provided between the clutch drum 52 and the clutch hub 53. Therefore, when the forward clutch 54 is connected, the rotation of the turbine shaft 26 is transmitted to the primary shaft 36 through the clutch hub 53, and the primary shaft 36 rotates in the positive rotational direction, the same direction as that of the turbine shaft 26.

A sun gear 55 is fixed to the primary shaft 36, and a ring gear 56 is arranged so that it is rotatable on the outer periphery of the sun gear 55. Planetary pinion gears meshing with each other as a pair are mounted, so that they are rotatable, on a carrier 57 fitted to the clutch drum 52, one of planetary pinion gears meshes with the sun gear 55 and the other meshes with the internal teeth of the ring gear 56. A multi-disk type reverse brake 58 is provided between the ring gear 56 and the transmission case 27, and the sun gear 55 and the primary shaft 36 rotate in an opposite direction to the turbine shaft 26 when the reverse brake 58 is putted in a braking state with the forward clutch 54 disengaged.

A hydraulic pump 59 mounted on the transmission case 27 is driven with the engine through the crankshaft 15 and a pump-side case. It is so arranged that a hydraulic oil discharged from the hydraulic pump 59 is supplied to a hydraulic equipment provided on the continuously variable transmission 35, lubricating portions, and the like.

Chemicals in the chemical tank 4 mounted on the bed 2 are supplied to the spray nozzles 7 by the working pump 8. As shown in FIG. 2, the working pump 8 is driven with a drive unit 61 mounted on the bed 2.

As shown in FIG. 2, a gear 62 as a power take-out means is fitted on the crankshaft 15. A gear 65, fixed on a working shaft 64, is so mounted that the gear 65 is rotatable within a unit case 63 of the drive unit 61, and meshes with the gear 62 through an intermediate gear 66. It is so arranged that the working shaft 64 is driven with the engine 10 which drives the working vehicle. The gears 62, 65, and 66 are provided to transmit the rotation of the crankshaft 15 to the working shaft 64, but it may be constructed in such a way that the power is transmitted through a chain or a belt.

A changeover clutch 67 for changing over power output direction between the states at which the working shaft 64 is connected to or disconnected from the crankshaft 15 is provided on the working shaft 64. This changeover clutch 67 has a clutch hub 68 fixed to the working shaft 64 and a clutch sleeve 69 which is axially movable on the working shaft 64 while constantly meshing with the clutch hub 68. An engaging ring 71 is fixed on the gear 65 facing the clutch sleeve 69.

A hydraulic type or electric type working actuator 72 is provided on the drive unit 61, and the clutch sleeve 69 is automatically operated and shifted to a state for transmitting the rotation of the crankshaft 15 to the working shaft 64 while engaging with the clutch hub 68 and the engaging ring 71, or to a state for disconnecting the transmission of power by engaging only with the clutch hub 68. In the drive unit 61 shown in FIG. 2, it is so arranged that the changeover operation between the connection of the working shaft 64 to and the disconnection thereof from the crankshaft 15 is automatically made by operating a switch at the operator's seat through the working actuator 72; however, the changeover may also be carried out manually, instead of using the working actuator, with a manual operation lever assembled with the drive unit 61.

The working pump 8 is detachably mounted on the drive unit 61, and as shown in FIG. 1, when spraying the chemicals, a liquid discharging pump is mounted on the drive unit 61 as the working pump 8, and when spreading the fertilizer or the topdressing, a hydraulic pump to drive a hydraulic motor which is assembled to a scraper is mounted on the drive unit 61. Depending on the kinds of works, a drive unit assembled with a working pump adapted for the kind of work may be mounted on the bed 2 without exchanging the working pump 8.

Figure 5:
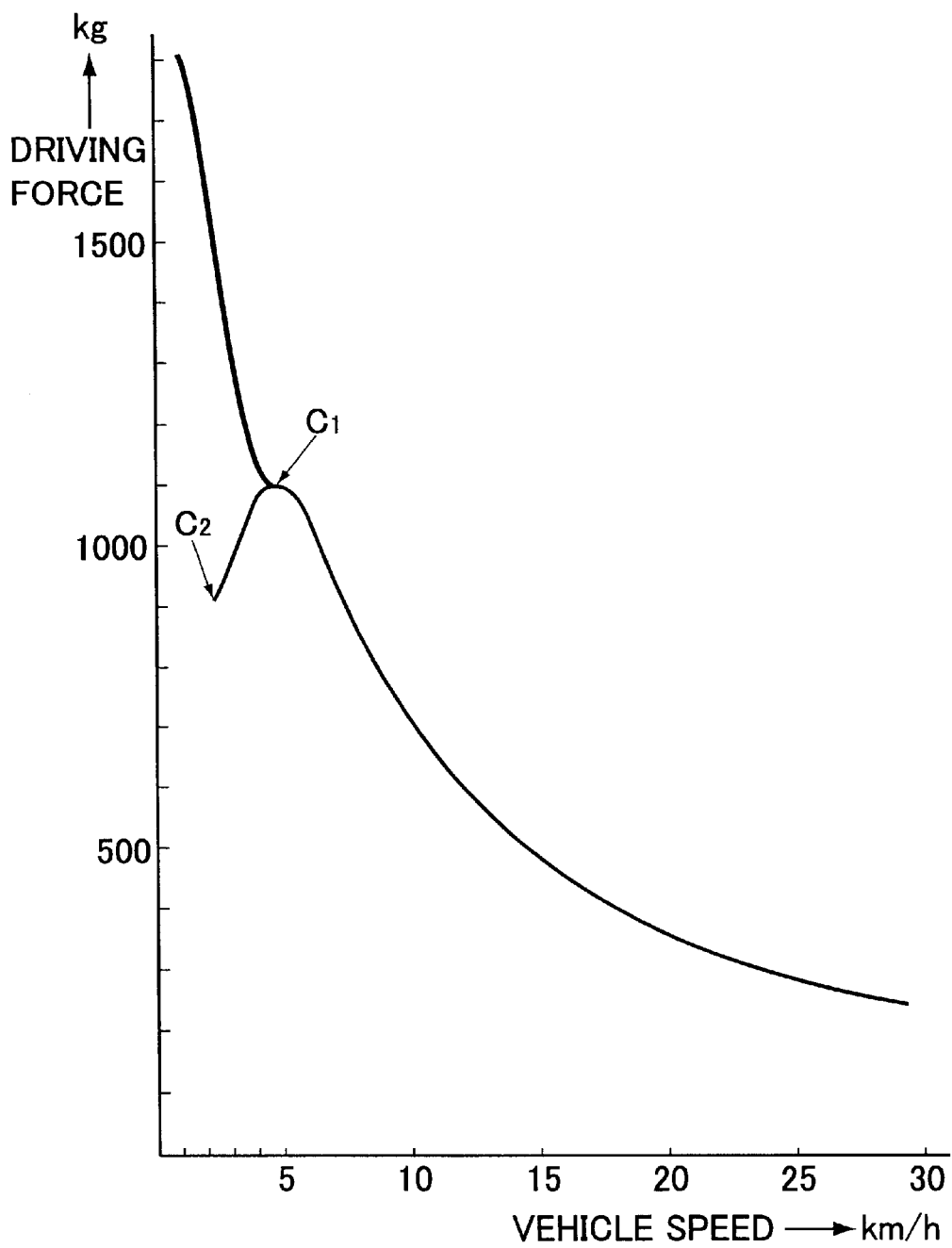
FIG. 5 is a power characteristics diagram showing a relationship between a driving force and a vehicle speed provided by an engine.

FIG. 5 is a power characteristics diagram showing the relationship between the driving force of a vehicle and vehicle speed provided by the engine 10 installed in the working vehicle. In FIG. 5, a thin line shows the driving force characteristic when the lock-up clutch 33 is engaged, and a bold line shows the driving force characteristics when the torque converter 12 is actuated after the lock-up clutch 33 is disengaged.

The driving force of the engine 10 reaches its maximum value at a vehicle speed of 4.5 km/h, which is a predetermined low travel speed C1, as shown by a thin line, and the driving force lowers even if the vehicle speed is lower than or higher than this speed. However, the driving force can be increased even if the travel speed is at 4.5 km/h or below, when the torque converter 12 is actuated by disengaging the lock-up clutch 33. Therefore, from the start of the vehicle until the vehicle speed reaches the predetermined low travel speed, or a lock-up force applying speed C1, the vehicle can be easily moved by actuating the torque converter 12 without causing the engine to stall or slipping the drive wheels.

When spraying the chemicals over turf grass, the working pump 8 is driven by the drive unit 61 while the vehicle is traveling; however, when the working pump 8 is driven while the torque converter 12 is actuated, the number of the revolutions of the working shaft 64 has no constant relationship with the vehicle speed. Therefore, chemical spraying work is conducted by making the working shaft 64 be in synchronization with the vehicle speed in a condition where the torque converter 12 is locked up after the vehicle has started and the lock-up force applying speed C1 has been exceeded. Thereby, the rotation of the engine is transmitted with a higher response so that fuel consumption can be improved.

However, once the vehicle speed has reached the lock-up state, engine stall does not occur even when the vehicle speed is lowered below the lock-up force applying speed C1. Therefore, a speed which is lower than the lock-up force applying speed C1 is set as a lock-up release speed, or work stop speed C2. This speed is in the range of 2 to 3 km/h, and by setting the lock-up release speed C2 at a speed lower than the lock-up force applying speed C1, the chemical spraying work can be conducted even when the vehicle is made to travel at a low travel speed which is lower than the lock-up force applying speed C1.

Figure 6:
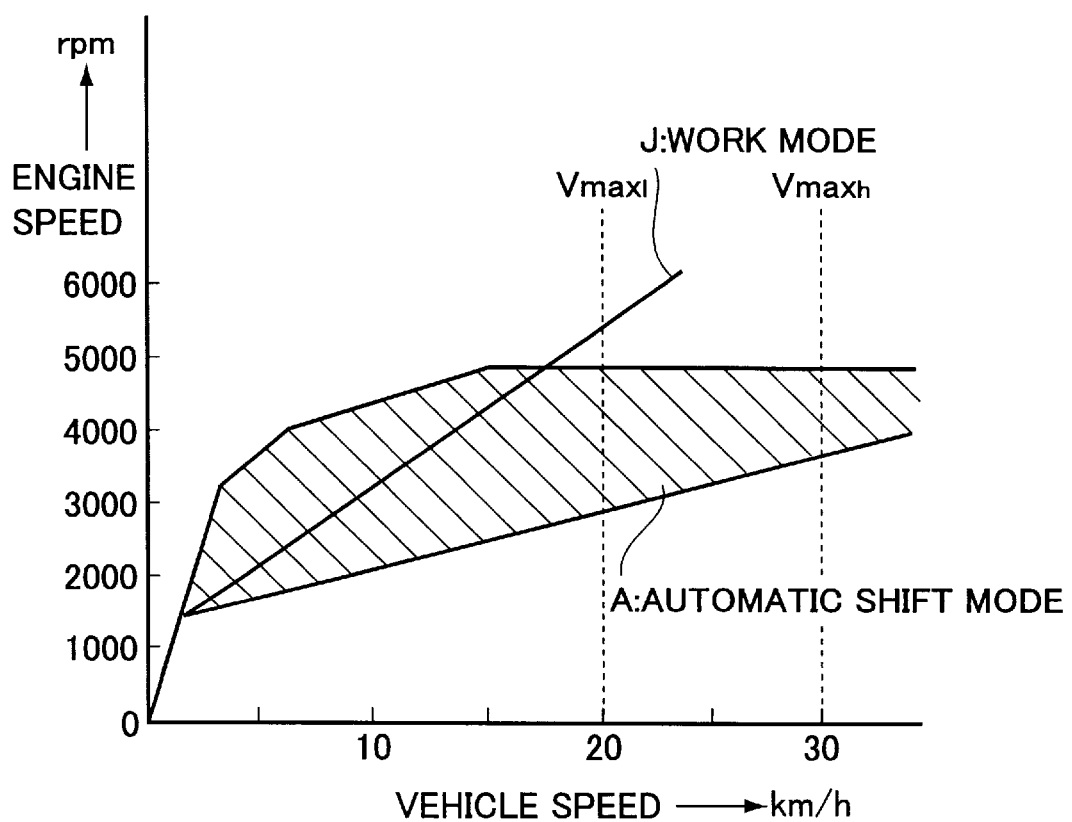
FIG. 6 is a sift characteristics diagram showing the relationship between an engine speed of the working vehicle and the vehicle speed.

FIG. 6 is a sift characteristics diagram showing the relationship between the engine speed and the travel speed of the working vehicle with the continuously variable transmission 35. The continuously variable transmission 35 can freely change a transmission ratio in an automatic sift mode A which lies within the hatched area between a low speed stage at which the radius of the belt on the primary pulley 37 is at a minimum and a high speed stage at which the radius of the belt on the primary pulley 37 is at a maximum.

Therefore, in the automatic sift mode A, a transmission ratio, or a pulley ratio, is automatically set at any value depending on the traveling condition of the vehicle, and travel of the vehicle when it is not in a spraying work state can be made at the most appropriate transmission ratio.

However, in the automatic sift mode A, the continuously variable transmission 35 voluntarily changes the speed depending on the throttle opening, engine speed, and vehicle speed, and thus the relationship between the engine speed, namely the rotational speed of a working machine, and the vehicle speed is not in a proportional relationship, so that a work such as chemical spraying cannot be uniformly carried out in the automatic sift mode A while the vehicle speed is being changed.

Then, in order to obtain a constant efficiency in the relationship with the vehicle speed in, for example, chemical spraying work conducted by driving the working shaft 64, it is necessary to set the work mode so as to enable the rotational speed of the working shaft 64 in a working range thereof to proportionally change in the relationship with the change of the vehicle speed as shown with the symbol J in FIG. 6. A change-speed line of the work mode J is set so as to enable the working vehicle to travel with the transmission ratio of the lowest stage until the vehicle speed thereof reaches a predetermined vehicle speed of the low speed range, and is set as a linear function having a predetermined slope, which represents the relationship between the rotational speed of the working shaft 64 (engine speed) and the vehicle speed, in the range over the predetermined vehicle speed, wherein the efficiency of each type of the work can be constantly kept at the most adequate value or required value in the relationship with the change of the vehicle speed. Thereby, the rotational speed of the working shaft 64 changes in synchronization with the vehicle speed, so that, in the work of, for example, chemical spraying, the chemicals can be sprayed with a uniform spraying density per unit area even if the vehicle speed is varied.

Figure 7:
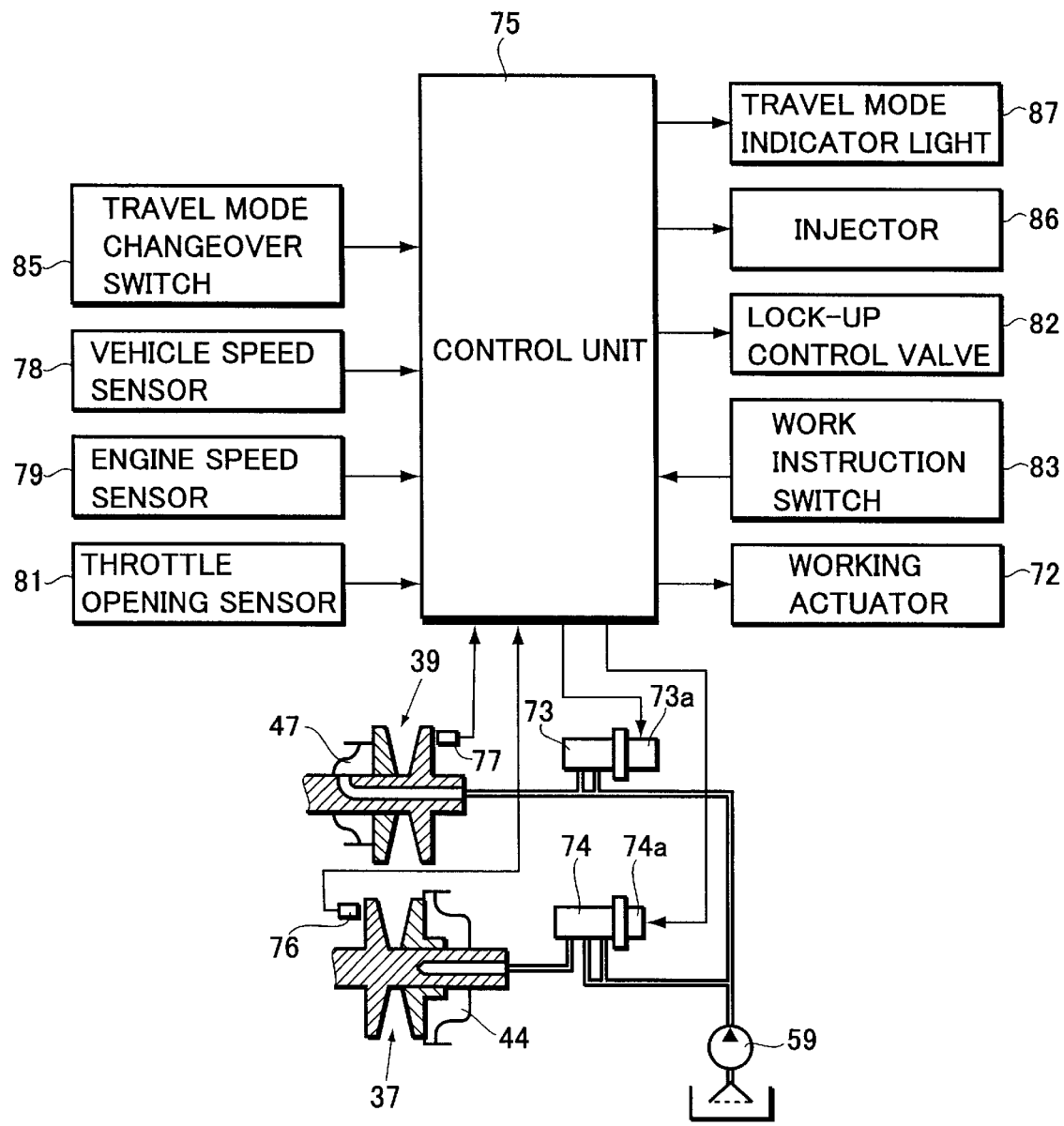
FIG. 7 is a block diagram showing the component of a control system of the engine and a continuously variable transmission.

FIG. 7 is a block diagram showing the structure of the control system of the engine 10 and the continuously variable transmission 35. As shown in FIG. 7, the discharge port of the hydraulic pump 59 driven by the crankshaft 15 is connected to a line pressure control valve 73 and a sift control valve 74. Discharge pressure from the hydraulic pump 59 is adjusted to a line pressure by the line pressure control valve 73, and the adjusted line pressure is supplied to a secondary oil chamber 47 as a secondary hydraulic pressure. The sift control valve 74 supplies a primary hydraulic pressure, obtained by adjusting the line pressure, to a primary oil chamber 44 to adjust the groove width of the primary pulley 37 so as to control the transmission ratio. An adequate tension according to the operating conditions is applied to the belt 41 by a secondary hydraulic pressure supplied in the secondary oil chamber 47.

Detection signals are sent to a control unit 75 from a primary-pulley speed sensor 76 for detecting the number of revolutions of the primary pulley 37, and from a secondary-pulley speed sensor 77 for detecting the number of revolutions of the secondary pulley 39. Furthermore, detection signals from a vehicle speed sensor 78, an engine speed sensor 79, and a throttle opening sensor 81 are sent to the control unit 75, and a changeover signal is sent from the control unit 75 to a lock-up control valve 82 provided for changing over the lock-up clutch 33 of the torque converter 12 between the lock-up engaged state and the lock-up disengaged state.

In addition, the control unit 75 functions as an engine control unit (ECU) for electronically controlling the engine. The unit calculates the amount of fuel to be supplied based on the engine speed and the throttle opening, and outputs a control signal to an injector 86 as fuel regulating means. In this way, the amount of the fuel to be supplied to the engine 10 is controlled. The control unit 75 also functions as travel mode changeover means, and it sets the travel mode either at the high speed travel mode or the low speed travel mode according to a signal from a travel mode changeover switch 85 provided at the operator's seat.

Figure 8:
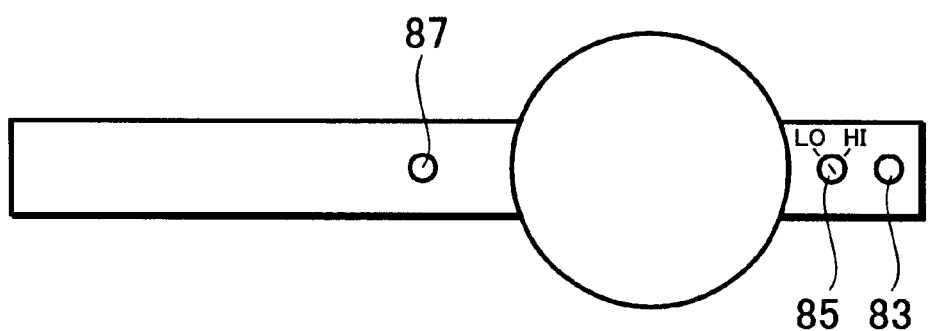
FIG. 8 is an explanatory drawing showing an arrangement at an operator's seat.

In this case, in the high speed travel mode, the vehicle speed is limited at or below a high speed limit Vmaxh (first speed limit, for example 34 km/h) which is set so that a legal maximum speed is not exceeded. In the low speed travel mode, the vehicle speed is limited at or below a low speed limit Vmaxl (second speed limit, for example 20 km/h) which is set at a lower speed than the high speed limit Vmaxh. The changeover between the two travel modes is carried out by the travel mode changeover switch 85 as described above, and the mode changeover switch 85 is, as shown in FIG. 8, provided at the operator's seat as a key switch. At the operator's seat, a travel mode indicator lamp 87 is provided as a mode indication device, and it is so arranged that the light is turned on when the low speed travel mode is selected, and the light is turned off when the high speed travel mode is selected. In this way, the operator is informed of the current travel mode.

In addition, the control unit 75 is provided with memories such as ROMs for storing data for the transmission ratios based on the travel conditions such as the vehicle speed in the automatic sift mode A, and based on the data for the transmission ratio in the work mode J, and the speed limit values corresponding to each travel mode. The control unit 75 is also provided with RAMs for temporarily storing the variables necessary for executing a program. Furthermore, the control unit 75 is provided with a CPU, and the like, for computing control signals for the transmission based on the detection signals from each sensor.

The form of operations of the working vehicle will now be described. In this vehicle, a maximum vehicle speed can be limited by a travel mode, and the operator or vehicle supervisor operates the travel mode changeover switch 85 to select a travel mode before work starts. In this way, the travel speed up to a legally permitted maximum speed is available when driven by a skilled operator; however, when operated by a beginner or when the vehicle is heavily loaded, the travel speed can be so limited that the speed only up to a predetermined low speed limit Vmaxl is available.

The travel mode changeover switch 85 is a key switch, and is operated by the operation key of the working vehicle or an exclusive mode changeover key. The exclusive key can prevent a travel mode from being falsely set or changed by the operator, thereby enabling the vehicle supervisor to appropriately manage the work carried out.

With an experienced operator, the travel mode changeover switch 85 is set to a high speed travel mode (HI) to efficiently work at high speeds. However, when a heavy object such as chemicals is loaded onto the vehicle, a low speed travel mode (LO) may be selected to prevent the vehicle from toppling over due to a high center of gravity or an influence from the movement of the chemicals. In such a case, the travel mode can be changed to the high speed travel mode when the load mounted on the vehicle has become lighter after spraying work so that the operator can quickly travel back to a supply base, garage, etc.

Contrary to this, in the case of the beginner, the work is allowed to be carried out with the travel mode change switch 85 set to the low speed travel mode. That is to say, the vehicle speed is so limited that the vehicle can travel only at a speed lower than a legally permitted maximum speed. Thereby, overspeeding can be prevented even if the working vehicle is operated by the beginner, and the work can be conducted safely.

When a travel mode has been selected, the current travel mode is indicated by the travel mode indicator lamp 87. That is to say, the travel mode indicator lamp 87 is turned on while the low speed travel mode is selected, and the lamp 87 is turned off while the high speed travel mode is selected. When the operator depresses an accelerator pedal with the travel mode selected, the engine speed increases and the vehicle starts to travel. At this time, a sift control described below is carried out according to a vehicle speed. Also, while at work, operations such as a lock-up control and the sift control based on the work mode J are carried out.

While traveling, the current speed of the working vehicle is detected by the vehicle speed sensor 78 and input to the control unit 75. The control unit 75 outputs a signal to the travel mode indicator lamp 87 when the vehicle speed reaches within a predetermined speed limit range (for example, in the range between a speed limit value and a value 4 km/h below the speed limit), and the signal causes the light to flicker warning the operator that the vehicle speed is approaching the speed limit value. Namely, when the high speed travel mode is selected with a speed of 34 km/h being set as the high speed limit Vmaxh, the travel mode indicator lamp 87 flickers when the speed of 30 km/h is reached. Also, when the low speed travel mode is selected with a speed of 20 km/h being set as the low speed limit Vmaxl, the travel mode indicator lamp 87 flickers when the speed of 16 km/h is reached.

When the vehicle speed exceeds the speed limit despite the flickering of the travel mode indicator lamp 87, the control unit 75 outputs an instruction signal to the injector 86 to shut off the fuel supply. This causes the drop of the engine speed to limit the vehicle speed at or below the speed limit. As soon as the vehicle speed is lowered up to below the speed limit, the fuel supply is resumed and the engine is returned again to normal conditions.

Thus, in the working vehicle of the present invention, because a plurality of travel modes with different speed limit values are provided, and the modes are selectively set by the control unit 75, the maximum speed can be changed without additionally installing specific devices with a conventional electronic control unit. Consequently, the speed limits can be changed depending on the working conditions such as the level of the operator's skill, for example, the skilled operator or the beginner, the weight of the object mounted on the vehicle, and the weather. In this way, safety at work can be improved. Furthermore, the operator can easily notice the current travel mode or approaching the speed limit, because a selected mode and approaching the speed limit are indicated by the travel mode indicator lamp 87.

Thus, when a travel mode is selected, the working vehicle travels in either the high speed travel mode or the low speed travel mode, and the vehicle travels with the automatic sift mode A when not engaged in works such as chemical spraying. That is to say, the voluntary transmission ratio is steplessly set depending on the travel conditions at any point within the hatched area in FIG. 6 by the signals from the vehicle speed sensor. When the high speed travel mode is selected, however, the maximum speed is limited at or below the high speed limit Vmaxh. In the same manner, when the low speed travel mode is selected, however, the maximum speed is limited at or below the low speed limit Vmaxl. Also, in this case, the lock-up clutch 33 is automatically controlled to changeover conditions depending on the vehicle speed.

When spraying chemicals is carried out with the working pump 8 driven by the working shaft 64, the changeover clutch 67 is set to a connecting state by actuating the working actuator 72. For this purpose, a work instruction switch 83 to operate the working actuator 72 is provided at the operator's seat, and it is so arranged that a signal by the work instruction switch 83 is transmitted to the control unit 75.

Consequently, when the operator operates the work instruction switch 83 to start chemical spraying work while the vehicle is stopping or traveling, the signal is sent to the working actuator 72 and then a change clutch 67 is actuated. Thereby, the working shaft 64 is connected to the crankshaft 15 to drive the working pump 8. On the other hand, the sift characteristics of the continuously variable transmission 35 is set with the work mode J, wherein the transmission ratio is arranged to be set along the predetermined change-speed line, namely so as to proportionally change the engine speed with the vehicle speed to drive the working vehicle.

In this work mode J, the rotational speed of the working pump 8 is in synchronization with the engine speed, and also the vehicle speed is varied in proportion to the engine speed. Therefore, even if the vehicle speed varies depending on the accelerator operation of the operator, the spraying amount of chemicals can be constantly kept per the unit area at a working area.

When the vehicle speed is at or below the work-stop speed C2 during spraying work, a control signal is outputted to the working actuator 72, and the working shaft 64 is disconnected from the crankshaft 15 by the changeover clutch 67 to stop the operation of the working pump 8. By providing at the operator's seat an indicator lamp which indicates whether the working pump 8 is in the operating state or in the non-operating state, the operator can visually discern the state of the working pump 8.

Embodiment 2

Figure 9:
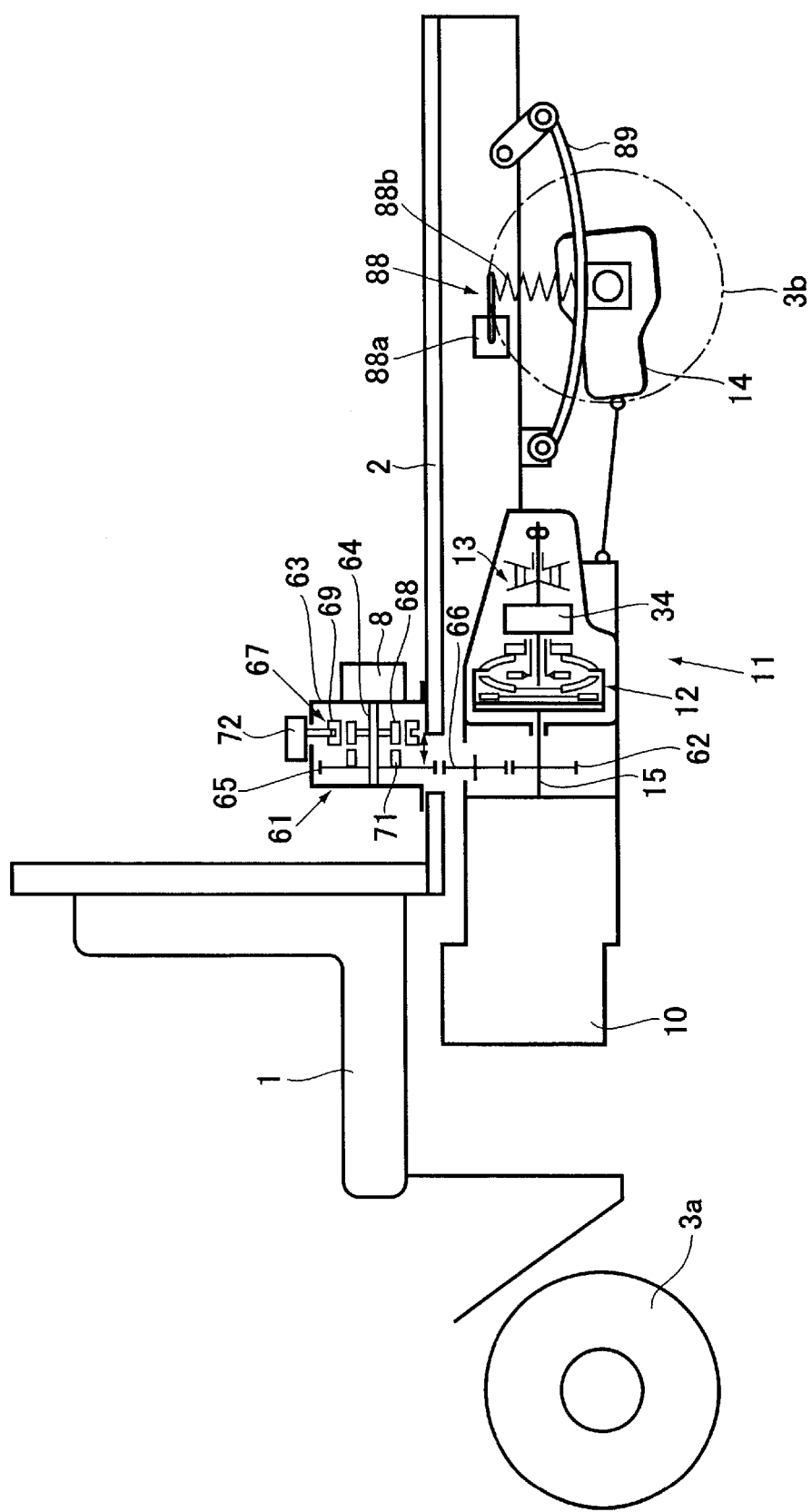
FIG. 9 is an enlarged side view showing the power transmitting flow of the working vehicle in a second embodiment of the present invention.
Figure 10:
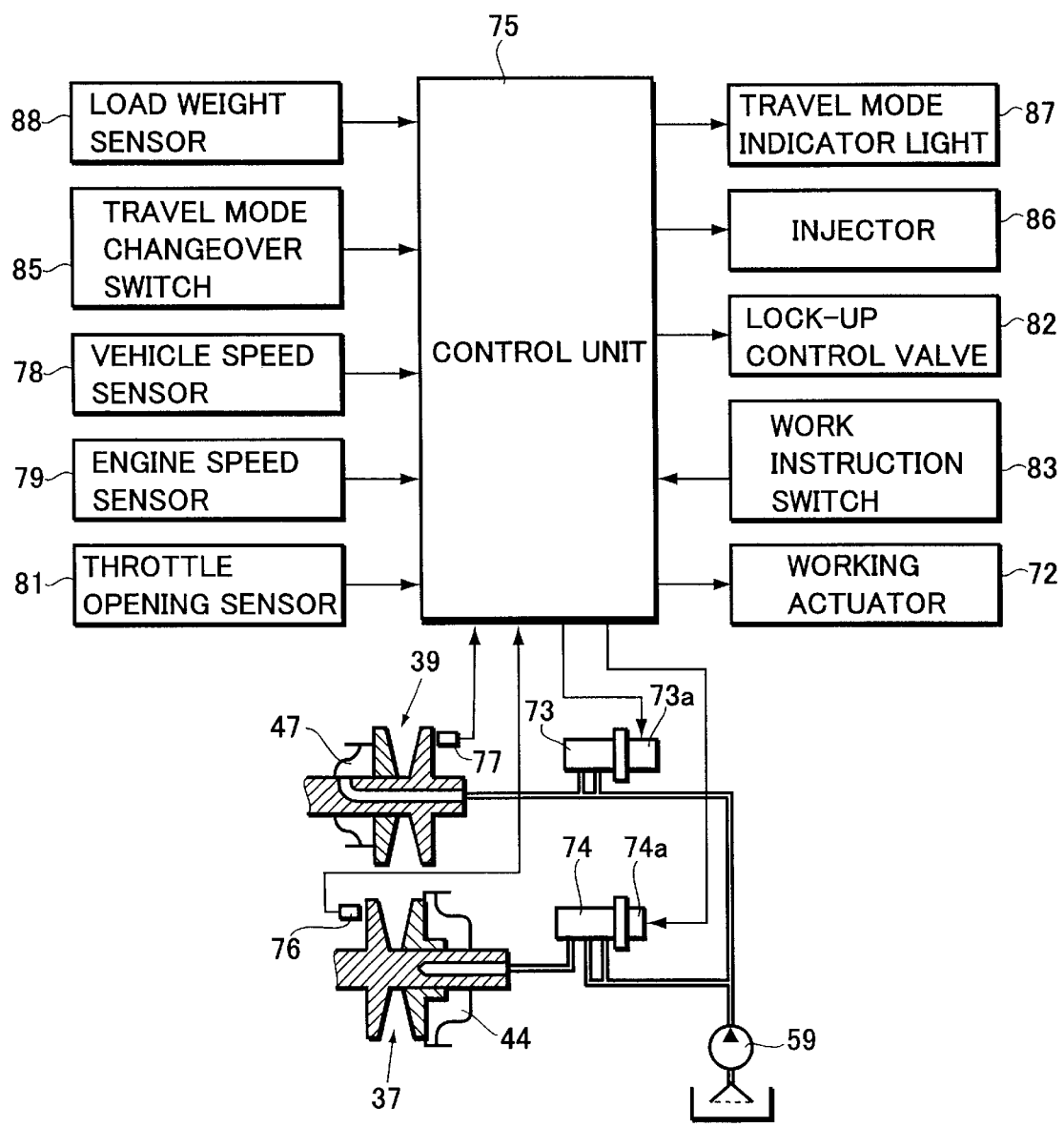
FIG. 10 is a block diagram showing a structure of a control system in the working vehicle in FIG. 9.

Next, the working vehicle in which the weight of the object mounted thereon is automatically detected to change the travel modes will be described as a second embodiment of the present invention. FIG. 9 is an enlarged side view showing the power transmitting flow of the working vehicle in the second embodiment of the present invention. FIG. 10 is a block diagram showing the structure of the control system of the working vehicle shown in FIG. 9. Because the fundamental structure of the working vehicle is the same as that of the first embodiment, the same numerals are used for the same parts, and the descriptions thereof will be omitted.

In the working vehicle in accordance with this embodiment, a load weight sensor 88 (weight detecting means) for detecting the weight of a working machine is provided as one of the travel mode changeover means. This load weight sensor 88 is composed of a limit switch 88a and a sensor spring 88b, and it is arranged in such a way that the weight loaded on the vehicle is detected as the amount of deflection of a leaf spring 89 mounted as a suspension device.

The leaf spring 89 deflects under the weight of chemicals in the chemical tank 4, and the amount of the deflection is substantially proportional to the amount of the chemicals. Then, the amount of deflection of the leaf spring 89 when the amount of chemicals (50% of the capacity of the chemical tank for example) reaches a level at which a maximum travel speed should be limited is measured in advance, and a load weight sensor 88 is set in such a way that, when the amount of the deflection of the leaf spring 89 exceeds the amount of the deflection measured in advance, it outputs a signal for telling the present situation to the control unit 75.

As soon as the signal from the load weight sensor 88 is received, the control unit 75 automatically set the travel mode to the low speed travel mode independently of the position of the travel mode changeover switch 85, causing the travel mode indicator lamp 87 to light. That is to say, even with the skilled operator and the vehicle loaded with the working machine having the weight equal to or heavier than a predetermined value, a maximum travel speed is set to the speed limit Vmaxl, or the low speed travel mode. Thus, arbitrary factors are eliminated in the operation of travel mode selection which is made based on the weight of the load mounted on the vehicle, and thereby safety at work can be improved.

When the amount of the chemicals decreases during the operation in such a way that a condition in which a maximum speed may be raised appears, the control unit 75 sets the travel mode in accordance with the position of the travel mode changeover switch 85. Consequently, while the high speed travel mode is selected by the travel mode changeover switch 85, the speed limit value is changed over to the high speed limit Vmaxh and the work can be conducted with increased speed thereafter. Contrary to this, when the low speed travel mode is selected, the low speed limit Vmaxl is continuously applied and a current speed limit is maintained. A sift control operation or a changeover to the work mode J can be carried out in the same way as the first embodiment.

As described above, in a working vehicle according to this embodiment, the weight of the working machine mounted on the vehicle is detected with the load weight sensor 88 and a travel mode is automatically set based on the weight detected. Therefore, with a heavier load mounted on the vehicle, the travel mode is automatically changed without the mode changeover operation being carried out by the operator or vehicle supervisor. A safe travel mode is set independently of the operator's skill, so that any mistakes in operation can be eliminated to improve safety at work. Also, when traveling back to replenish the chemicals when a small amount of chemicals still remains in the chemical tank or when only a small amount remains after spraying has been finished, the travel mode is automatically changed over to the high speed travel mode, so that the vehicle can quickly return to the supply base, garage, etc., and the work efficiency is improved.

The present invention is not limited to the embodiments described above, and it will be clearly understood to those skilled in the art that various changes and modifications may be made without departing from the spirit of the invention.

For example, the working vehicle shown in the figures is equipped with the continuously variable transmission as the automatic transmission; however, an ordinary planetary gear type automatic transmission may be used. Also, the transmission is not limited to the automatic types, and a manual type transmission can also be used.

Furthermore, in the embodiments described above, the speeds are limited by controlling the amount of the fuel to be injected through using the engine with a fuel injection system; however, the engine speed can also be limited by controlling through an electric throttle device of the engine.

The embodiments described above show an example provided with two kinds of speed limits, high and low travel speeds; however, three kinds of travel speeds, low, medium, and high travel speeds, may also be provided, and the number of the speed limits is not limited to that described above. Also, speed limit values are not limited to those described above. In addition, the form of weight detecting means is not limited to those where the deflection of the leaf spring is detected by using a limit switch. Other weight detecting means such as a weight scale installed under the lower part of the chemical tank can also be adopted.

While there have been described what are at present considered to be preferred embodiments of the present invention, it will be understood that various modifications may be made thereto, and it is intended that the appended claims cover all such modifications as fall within the true spirit and scope of the invention.

What is claimed is:

1. A working vehicle including an engine and a working machine mounted on the vehicle, comprising:
    a vehicle speed sensor for detecting a travel speed of said working vehicle;
    travel mode changeover means having a position that sets any one of a plurality of travel modes with different predetermined maximum speed limits and that prevents an operator from changing the travel mode; and
    control means for controlling said working vehicle in such a manner that the travel speed of said working vehicle detected by said vehicle speed sensor is reduced after said speed exceeds a predetermined speed limit of the travel mode set by said travel mode changeover means.

2. The working vehicle according to claim 1, wherein said travel mode changeover means includes a switch adapted to be operated by a vehicle supervisor, said switch adapted to be non-operable by an operator when the working vehicle is traveling.

3. The working vehicle of claim 1, further comprising:
    warning means for warning an operator that the travel speed is approaching a predetermined speed limit when entering a predetermined range below a predetermined speed limit of each travel mode.

4. The working vehicle of claim 1, further comprising:
    fuel regulating means for regulating fuel to be supplied to said engine,
    wherein supplying the fuel is stopped by said fuel regulating means when the travel speed exceeds a predetermined speed limit.

5. The vehicle of claim 1, wherein said travel mode switch is adapted to be operated by a vehicle supervisor.

6. The vehicle of claim 5, wherein said travel mode switch comprises a key switch.

7. The vehicle of claim 1, further comprising a warning indicator that generates a warning indication in response to said speed signal approaching a speed corresponding to a predetermined speed limit of said current travel mode.

8. The vehicle of claim 7, wherein said warning indicator generates said warning indication when said vehicle speed enters a predetermined range below said predetermined speed limit of said current travel mode.

9. The vehicle of claim 1, wherein said controlling means comprises a fuel regulating means.

10. The vehicle of claim 9, wherein said fuel regulating means stops a fuel supply to said vehicle in response to said speed signal indicating a speed of said vehicle exceeding a predetermined speed limit of said current travel mode.

11. The vehicle of claim 10, wherein said fuel regulating means resumes said fuel supply in response to said speed signal indicating a speed of said vehicle being lower than a predetermined speed limit of said current travel mode.

12. The vehicle of claim 1, wherein said travel modes permit operation of the working vehicle at any speed less than a corresponding predetermined maximum speed limit.

13. A working vehicle comprising:
- a vehicle speed sensor that generates a speed signal which indicates a speed of said vehicle;
- a travel mode switch having a position that sets one of a plurality of travel modes which each have a predetermined maximum speed limit to determine a current travel mode and that prevents an operator from changing the travel mode; and
- a controller in communication with said vehicle speed sensor and said travel mode switch that reduces the speed of said vehicle in response to said speed signal indicating a speed of said vehicle exceeding a predetermined speed limit of said current travel mode.

14. The vehicle of claim 13, wherein said travel modes permit operation of the working vehicle at any speed less than a corresponding predetermined maximum speed limit.

15. A working vehicle including an engine and a working machine mounted on the vehicle comprising:
- a vehicle speed sensor for detecting a travel speed of said working vehicle;
- travel mode changeover means for manually setting any one of a plurality of travel modes with different predetermined speed limits; and
- control means for controlling said working vehicle in such a manner that the travel speed of the working vehicle detected by the vehicle speed sensor is reduced after said speed exceeds a predetermined speed limit of the travel mode set by said travel mode changeover means,
- wherein the travel mode is selected as a function of one of a user's experience, a user's age, a user's skill level, a weight of said working vehicle, and the weather.

* * * * *